Patented Dec. 1, 1953

2,661,312

UNITED STATES PATENT OFFICE 2,661,312

TEXTILE FINISHING COMPOSITION AND METHOD OF TREATING TEXTILE MATERIALS THEREWITH

Graham M. Richardson, Wilmington, Del., assignor to E. I. du Pont de Nemours & Company, Wilmington, Del., a corporation of Delaware No Drawing. Application June 14, 1951, Serial No. 231,678

2 Claims. (Cl. 117—139.4)

This invention relates to the treatment of textile materials so as to improve their stiffness and crease-resistance. More particularly it relates to a new composition of matter comprising an aqueous starch solution containing 1,3-bis-(hydroxymethyl) 2-imidazolidone and to the process of applying this composition to textiles.

It has long been the practice in both the textile and paper industries to apply starch solutions to the fibers for various purposes. With the advent of heat-hardenable resins such as the urea and melamine resins, it appeared desirable to apply mixtures of one of these resins with starch in order to obtain a more durable or otherwise improved finish. Many such compositions have been employed and have resulted in fabrics of improved crease-resistance and resistance to moisture, while retaining the advantageous effects produced by starch treatment alone. Best results are obtained when the resinous material is added in such a form and under such conditions as to permit it to finally set to an insoluble form after it is applied to the textile. A condensation catalyst is usually present in the mixture to assist in this hardening step. In general it is necessary to apply such mixtures of starch and heat-hardenable resin or resin-forming material at a relatively low temperature, up to about 120° F., since at higher temperatures premature setting of the resin takes place and the compositions tend to thicken to such an extent that they cannot easily be applied to the fabric. This effect is utilized when a starch having increased viscosity is desired. Thus in United States Patent 2,407,071 it is stated that the viscosity of starch can be greatly increased by heating the starch with a urea-formaldehyde polymer, dimethylolurea or a melamine-formaldehyde monomer at a pH between 1.5 and 7 and at a temperature between 50 and 60° C. (122 and 140° F.).

In many of the ordinary applications of starch to textile materials, it is convenient and sometimes necessary to apply the aqueous starch bath at a higher temperature, for example, between 165° and 180° F. Better impregnation is obtained by application at this higher temperature. Furthermore, the starch composition is usually prepared by cooking at an elevated temperature. Greater efficiency and economy of operation are achieved when the composition is applied to the textile without first having to cool it.

It is an object of this invention to provide a textile finishing composition having a high degree of stability with respect to changes in viscosity at temperatures between 165° F. and the boiling point of the composition, which may be applied at these temperatures to textile materials and which may thereafter be converted to an insoluble form on the fibers. A further object is to provide such a composition which when applied to the textile material imparts improved stiffness and body together with crease-resistance and dimensional stabilization of the textile.

According to this invention, these and other objects are attained by the use of a finishing composition comprising 1,3 - bis - (hydroxymethyl) 2-imidazolidone, starch, an acid catalyst such as tartaric acid and water. Preferred compositions are those containing from 2 to 12 percent by weight of 1,3-bis-(hydroxymethyl) 2-imidazolidone, from 1.5 to 7 percent by weight of starch and from 0.1 to 3.0 percent by weight of tartaric acid. Such compositions may be held for several hours at temperatures up to the boiling point without significant change in viscosity. When applied to a textile material such as cotton and held at a temperature above the boiling point of the solution, the solid components of this mixture are converted to an insoluble form.

The compound 1,3 - bis - (hydroxymethyl) 2-imidazolidone has the formula

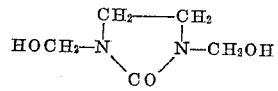

It may be prepared by the reaction between formaldehyde and ethyleneurea, as disclosed in United States Patent 2,373,136.

The preparation and use of the composition of this invention are illustrated by the following example, in which parts are by weight:

Example

A stock solution of standard 40 fluidity pearl corn starch is prepared by stirring 100 parts of starch in small amounts of water to form a paste and adding additional water until a total of 200 parts have been used. This solution is prepared at room temperature. Fifty (50) parts of this stock starch solution, 50 parts of a 50% aqueous solution of 1,3 - bis - (hydroxymethyl) 2-imidazolidone, and 2.8 parts of tartaric acid are added to 370 parts of boiling water. The solution is diluted with 27.2 parts of water to give a total of 500 parts. The solution is held at 165° to 170° F. for about thirty minutes and exhibits essentially no change in viscosity. Its viscosity is equal to that of a solution containing the same amount of starch but no 1,3-bis-(hydroxymethyl) 2-imidazolidone or tartaric acid. An 8 x 12 inch piece of cotton sheeting is immersed at 168° F. in the solution containing starch, 1,3-bis-(hydroxymethyl) 2-imidazolidone and tartaric acid. The sheeting is then passed through squeeze rollers, is dried and baked for three minutes at 350° F. The fabric is then neutralized in a mild alkali, rinsed, pressed and is found to have improved properties of stiffness, body, crease-resistance and dimensional stabilization.

When the bath is held for three to four hours near the boiling point, there is no apparent change in viscosity or decrease in its effectiveness in imparting crease-resistance and dimensional stabilization to cotton.

The relative proportions of the components in the composition of this invention may be varied considerably without sacrificing its desirable characteristics. The amount of 1,3-bis-(hydroxymethyl) 2-imidazolidone may be varied from about 1 to about 15 percent, depending upon the degree of crease-resistance and dimensional stabilization that is desired and upon the particular textile fabric which is to be treated. Similarly the amount of starch can be varied widely to give the desired amount of stiffness and body. Ordinarily about 0.5 percent by weight of tartaric acid will be employed although greater or less amounts may be used if more or less rapid setting of the composition on the fabric is desired.

In place of the 1,3-bis-(hydroxymethyl) 2-imidazolidone, similar compounds containing less than two hydroxymethyl groups per molecule may be used with satisfactory results. It is desirable that the imidazolidone contain on the average at least 1.4 hydroxymethyl groups per molecule. The lower alkyl ethers of 1,3-bis-(hydroxymethyl) 2-imidazolidone, such as 1,3-bis-(methylhydroxymethyl) 2-imidazolidone and 1,3-bis-(ethylhydroxymethyl) 2 - imidazolidone, are also effective in this connection.

Instead of the tartaric acid, other catalysts which are mildly acid or which develop an acid reaction upon heating may be used. Examples of such catalysts are diammonium acid phosphate, ammonium tartrate, zinc nitrate or even very small amounts of mineral acids. The particular catalyst and the amount which is used should be selected so that the pH of the composition is not lower than 3.5, since more acid conditions lead to rapid hydrolysis of the starch with attendant loss in the desired finishing qualities. It is not necessary that the catalyst compound itself be acid, so long as during the heating treatment of the impregnated fabric, it forms an acid which can effect a condensation of components of the treating composition to an insoluble form. Ammonium salts are examples of this type of catalyst. It is believed that the pH during curing is ordinarily of the order of 3.5 to 5.5.

The composition of this invention may be employed by itself or it may be used together with other materials such as dextrine, softeners, and filling materials such as talc and chalk. Specific commercial operations for which the composition is particularly adapted are back-starching and back filling, which are commonly performed with cellulosic fabrics. In each of these operations, the starch is added to the back of a fabric in order to increase the stiffness and body of the fabric. In the case of back-filling, talc or other filler is incorporated in the starch solution. The solution is customarily held at a temperature above 165° or 185° F. during these operations to secure adequate impregnation.

After application of the starch composition containing the imidazolidone to the fabric, it is insolubilized by heating above the boiling point of the solution. The temperature employed and the duration of the heating will depend upon the fabric used, the amount of the imidazolidone in the treating composition and the amount of acid catalyst. Any temperature up to that at which either the starch or the fabric is adversely affected may be used. As shown in the example, three minutes heating at 350° F. are sufficient to produce satisfactory properties with the composition there employed. With more delicate fabrics, longer heating times at lower temperatures will be preferable.

I claim:

1. An aqueous textile finishing composition having a high degree of stability with respect to changes in viscosity at temperatures between 165° F. and the boiling point which contains from 2 to 12 percent by weight of 1,3-bis-(hydroxymethyl) 2-imidazolidone, from 1.5 to 7 percent by weight of starch and from 0.1 to 3.0 percent by weight of tartaric acid.

2. A process for treating textile materials which comprises contacting the textile material with an aqueous composition containing from 2 to 12 percent by weight of 1,3-bis-(hydroxymethyl) 2-imidazolidone, from 1.5 to 7 percent by weight of starch and from 0.1 to 3.0 percent tartaric acid at a temperature between 165° F. and the boiling point of the composition, thereafter drying the treated textile material and heating it to a temperature above the boiling point of the composition until the treating agent is set upon the textile.

GRAHAM M. RICHARDSON.

References Cited in the file of this patent

UNITED STATES PATENTS

| Number | Name | Date |
|---|---|---|
| 2,121,006 | Bener | June 21, 1938 |
| 2,238,839 | Watkins | Apr. 15, 1941 |
| 2,373,136 | Hoover et al. | Apr. 10, 1945 |